United States Patent
Luedi et al.

(10) Patent No.: US 11,651,484 B2
(45) Date of Patent: May 16, 2023

(54) QUALITY CONTROL OF A LASER MACHINING PROCESS USING MACHINE LEARNING

(71) Applicant: BYSTRONIC LASER AG, Niederönz (CH)

(72) Inventors: Andreas Luedi, Burgdorf (CH); Roland Bader, Ruetschelen (CH); Matthias Schranz, Jegenstorf (CH); Joël Baertschi, Worblaufen (CH)

(73) Assignee: BYSTRONIC LASER AG, Niederoenz (CH)

( * ) Notice: Subject to any disclaimer, the term of this patent is extended or adjusted under 35 U.S.C. 154(b) by 0 days.

(21) Appl. No.: 17/906,801

(22) PCT Filed: Mar. 3, 2021

(86) PCT No.: PCT/EP2021/055305
§ 371 (c)(1),
(2) Date: Sep. 20, 2022

(87) PCT Pub. No.: WO2021/190889
PCT Pub. Date: Sep. 30, 2021

(65) Prior Publication Data
US 2023/0118061 A1 Apr. 20, 2023

(30) Foreign Application Priority Data
Mar. 25, 2020 (EP) ..................................... 20165589

(51) Int. Cl.
*G06K 9/00* (2022.01)
*G06T 7/00* (2017.01)
(Continued)

(52) U.S. Cl.
CPC ............ *G06T 7/001* (2013.01); *B23K 26/032* (2013.01); *B23K 26/38* (2013.01); *B23K 31/125* (2013.01);
(Continued)

(58) Field of Classification Search
CPC .......... G06T 7/001; G06T 2207/10016; G06T 2207/10152; G06T 2207/20081;
(Continued)

(56) References Cited

U.S. PATENT DOCUMENTS

2017/0132465 A1* 5/2017 Kutter .................. G06K 7/1417
2018/0147658 A1 5/2018 Shapiro
(Continued)

FOREIGN PATENT DOCUMENTS

DE 102009050784 B4 5/2011
EP 1275465 A1 1/2003
(Continued)

OTHER PUBLICATIONS

International Search Report and Written Opinion, dated Jun. 4, 2021, from PCT/EP2021/055305.
(Continued)

*Primary Examiner* — Samir A Ahmed
(74) *Attorney, Agent, or Firm* — Workman Nydegger

(57) ABSTRACT

A method for process monitoring of a laser machining process for estimating a machining quality is dicloses. The method may include steps, which are carried out in real time during the machining process of providing at least one captured first signal sequence with a first feature form a machining zone, providing at least one captured second signal sequence with a second feature from the machining zone, and accessing a trained neural network with at least the recorded first and second signal sequences in order to calculate a result for estimating the machining quality.

15 Claims, 12 Drawing Sheets

(51) Int. Cl.
B23K 31/12 (2006.01)
B23K 26/03 (2006.01)
B23K 26/38 (2014.01)

(52) U.S. Cl.
CPC ............... *G06T 2207/10016* (2013.01); *G06T 2207/10152* (2013.01); *G06T 2207/20081* (2013.01); *G06T 2207/20084* (2013.01); *G06T 2207/30108* (2013.01)

(58) Field of Classification Search
CPC ........... G06T 2207/20084; G06T 2207/30108; B23K 26/032; B23K 26/38; B23K 31/125
See application file for complete search history.

(56) References Cited

U.S. PATENT DOCUMENTS

| | | | | |
|---|---|---|---|---|
| 2019/0375051 | A1* | 12/2019 | Regaard | B23K 26/38 |
| 2021/0158562 | A1* | 5/2021 | Nakamura | G01S 17/89 |
| 2021/0237208 | A1* | 8/2021 | Lessmueller | B23K 26/032 |

FOREIGN PATENT DOCUMENTS

| | | |
|---|---|---|
| EP | 2365889 B1 | 7/2016 |
| EP | 3159093 B1 | 7/2018 |
| WO | 01/39919 A2 | 6/2001 |
| WO | 2016181359 A1 | 11/2016 |
| WO | 2018069308 A1 | 4/2018 |
| WO | 2020/104103 A1 | 5/2020 |

OTHER PUBLICATIONS

International Preliminary Report on Patentability, dated Aug. 2, 2022, from PCT/EP2021/055305.

Santolini, Giorgio et al. "Cut Quality Estimation in Industrial Laser Cutting Machines: A Machine Learning Approach", 2019 IEEE/CVF Conference on Computer Vision and Pattern Recognition Workshops (CVPRW), IEEE, Jun. 16, 2019, pp. 389-397.

Blakely, C., "Signifaifx: Adaptive Real-Time Learning and Prediction, A Sparse Hierarchical Machine Learning Algorithm", Swiss Conference on Data Science, Jun. 14, 2019.

* cited by examiner

QUALITY CONTROL OF A LASER MACHINING PROCESS USING MACHINE LEARNING

The invention relates to the quality assurance of laser machining systems, in particular laser cutting systems, such as flatbed cutting machines by means of a machine learning model, in particular with a deep neural network architecture (deep neural network—DNN).

On the one hand, the development of laser systems strives to significantly increase machine autonomy so that production can be carried out more efficiently with fewer staff. Therefore, the autonomous monitoring of the machine (e.g. flatbed cutting machine) and the process must be continuously improved. Suitable sensors and appropriate intelligence are becoming important. Modern cutting machines increasingly need comprehensive process sensors, with which cutting breaks and quality losses (e.g. rough cutting edges, burr adhesion, slag formation, etc.) should be captured.

On the other hand, compliance with quality standards in laser machining is of the utmost importance. For this reason, it was previously provided in the prior art, for example, that the cutting quality actually achieved had to be subsequently determined by manual inspection. This approach does not correspond to the efforts described above to further automate the process. The power of a laser of ten kilowatts and more and the fast processing also generally place high demands on the control of the system. External factors such as different quality of the workpiece material, rusty or overheated workpiece material or contamination of the laser protection glass or the laser optics affect the quality of the cut. Rough cutting edges, excessive burr formation, uneven cutting gap widths or even welding of the cutting gap can result.

In addition to the cutting speed, the cutting quality is essential. Unfortunately, the cutting quality has so far not been satisfactorily recognised directly in real time during the cutting process, since no meaningful view of the cutting edge or cutting front of the material being processed is possible. At most, a view of an extremely shortened cutting front is possible, from which hardly any information could previously be extracted. Therefore, on today's machines, as described above, the cut workpiece can only be removed from the machine after cutting and inspected for quality.

By means of optical sensors (photodiodes), the so-called thermal lighting or process lighting can be captured during machining and used for later quality assessment, as studies have shown that there is a correlation between the two parameters (process lighting and process quality).

Some cutting machines already have process monitoring, although this is quite simply designed. Most of the time, a photodiode in the cutting head observes the process during cutting. If the process becomes unstable and a plasma cut occurs, the process glows much more intensely, which is recognised by the photodiode. As a result, the machine can react, for example it can stop, take corrective measures (clean cutting head nozzle/recalibrate, etc.) or continue at a reduced speed. However, the benefits of process monitoring, which is only equipped with photodiodes, are modest. For example, cutting instabilities cannot be recognised directly during cutting for all materials, for all workpiece thicknesses, and in particular not during flame cutting. The cutting or cut quality is also not recognised.

In the prior art, it is basically known to use a suitable optical sensor system for process monitoring. WO2018069308A1 shows the observation of the cutting gap width, showing that the focus position of the working laser can be determined by means of cutting gap width recognition. DE102009050784B4 shows the use of camera and illumination, with images being recorded with different lighting conditions, which are evaluated together to assess process features.

It is also known to use model-based classification methods which require the model to be learned in a training phase. For this purpose, manually or empirically relevant features are determined in order to solve the respective classification task. For example, EP2357057A1 discloses a method for monitoring the quality of laser machining processes by capturing signals via optical sensors, such as photodiodes. Characteristic values are calculated from the signals and related to the corresponding characteristic values for standard cutting quality. The quality conditions are modelled on the basis of the characteristic values with the aid of clustering methods. In addition, the process parameters associated with the quality conditions are also saved and used for regulation.

EP2365889B1 discloses process monitoring which extracts characteristic values from camera and other sensor data and classifies the current laser machining operation by means of the position of the current characteristic values relative to a previously provided quantity of points in the characteristic value space.

The approaches known in the prior art are based on the application of the classical feature extraction and characteristic value determination. However, these approaches are limited in their power, in particular if they are used to determine the cutting quality during cutting with a high degree of reliability or if hitherto unknown relationships between the input data for achieving the object (here: assessment of the cutting quality) should be processable.

The only known work in which deep learning has so far been used in laser cutting is documented by G. Santolini et al. [Santolini, G. et al.: *Cut Quality Estimation in Industrial Laser Cutting Machines: A Machine Learning Approach, CVPR* 2019]. Santolini describes that deep neural networks (DNN) can be used to estimate the cutting quality during laser cutting, based on signals from photodiodes. The disadvantage of such a system with photodiodes is that no spatially resolved data is available from the process zone. Photodiode signals are influenced by many factors that are not related to the cutting quality, such as the condition of the nozzle and contamination. This causes temporal drift. In addition, quality features can only be estimated for thin sheet metal.

Starting from the prior art described above, the object of the present invention is to provide an approach with which the quality can be estimated more reliably during the machining process and with increased specificity and improved test coverage. In addition, the approach should be more robust against interfering influences (material properties, ambient light, changes in process lighting over time, etc.). In particular, an estimate in real time should be possible.

This object is achieved by the subject matters of the appended independent claims, in particular by a method, a computing unit and a laser system with such a computing unit and by a computer program product.

In a first aspect, the invention relates to a computer-implemented method for process monitoring of a laser machining process for estimating a machining quality, having the following steps, which are carried out during the machining process:

providing at least one captured first signal sequence (for example individual images or a video stream from a camera) with a first feature (e.g. with illumination) from the machining zone;

providing at least one captured second signal sequence with a second feature (e.g. without illumination) from the machining zone;

accessing at least one—computer-implemented and machine—neural network (e.g. deep neural network/DNN or convolutional neural network/CNN) with at least the captured first and second signal sequence in order to calculate an estimate of the machining quality as a result and, in particular, classifying the machining quality (e.g. in two classes: GOOD/reject).

In studies, it has proven to be particularly advantageous that the first signal sequence and the second signal sequence are selected in such a way that they capture different observation parameters of the cutting gap, i.e. width, symmetry, etc., on the one hand, and radiation centre, radiation area, etc., on the other.

The aforementioned steps are advantageously carried out in real time. The term "real time" is to be understood in the sense of the DIN ISO/IEC 2382 standard such that it refers to a period of time during ongoing machining by the laser. Real time does not only mean the narrow time frame of a few milliseconds that is required for rapid control of the cutting process, but can also refer to a period of time in seconds (e.g. in the range of 1-5 seconds, preferably 1 to 2 seconds). Real time means that the steps, in particular providing the result with the quality estimation, are carried out with a time delay (in comparison with the laser machining process) of no more than a few seconds so that, for example, suitable measures can be taken to influence the cutting process, in particular automatic cutting quality optimisation.

In a preferred embodiment of the invention, the first signal sequence and/or the second signal sequence can be or comprise an optical signal sequence. The first and/or second signal sequence can captured with the same optical sensor, for example a camera and/or at least one photodiode. The first and/or second signal sequence is preferably captured in alternating form. The sensor, e.g. the camera, records the first signal sequence in a first time interval and the second signal sequence in a second time interval. The pattern for determining the alternation of the signal sequence capture can be defined in a preparation phase (e.g. always alternating, just alternating or according to a different scheme, for example twice the first signal sequence and once the second signal sequence). For further details and exemplary embodiments, reference is made to PCT/EP2017/081901 by the applicant. The different captured signals can thus be weighted differently for the subsequent quality estimation calculation. In this embodiment of the invention, the machine learning model is designed for the processing of individual images (image-based). A classification result (with the machining quality estimation) is thus available after just one image/frame. Since the alternately recorded individual images can also be reassembled into (two) new streams, the machine learning model can in particular also be referred to as "video-based" or "stream-based".

In addition to the optical signal capture, alternative embodiments provide for other signal type capture, such as an acoustic signal capture alternatively or cumulatively to the optical signal. The models are trained accordingly with acoustic training data.

In a further, preferred embodiment of the invention, the neural network for implementing a machine learning model is designed as a deep learning model or deep neural network (DNN) with corresponding deep learning algorithms. The deep learning algorithm thus not only trains the classifier, but also the feature extractor. In this way, the machine learning model is trained to recognise from the captured first and second signal sequence automatically and without a previous analysis of properties (or features—feature extraction) which properties/features, in particular which spatial and/or temporal properties, of the first and second signal sequence are relevant for estimating the machining quality and should be taken into account for calculating the result. This approach implements a feature extractor-free (or feature-free) process. This means that a so-called end-to-end algorithm can be implemented. In this context, "end-to-end" means that the raw data, i.e. the captured signal sequences, can be used without significant preprocessing and in particular without manual determination of the features in the signal sequences, which are then processed (e.g. classified) to a result using a machine learning algorithm (hereinafter also referred to as an ML-algorithm). In this context, "without substantial preprocessing" means apart from a marginal preprocessing, such as a histogram equalisation, an image depth reduction and/or an ROI crop (ROI—region of interest). In particular, the end-to-end approach does not require separate preprocessing of the raw data to extract the features that are important for learning. In contrast to the classic ML approach with preceding feature extraction, not only is the classifier trained by an algorithm in the solution presented here, but the feature extractor is preferably also trained in the same step. This means that the algorithm calculates or learns representations independently from the input data or raw data and thus also the "features". In order to recognise this connection, the algorithm must independently find the best representation of the input data in order to classify it. The fact that no characteristic values (features) have to be extracted in the method according to the invention is advantageous in several ways. On the one hand, the effort involved in developing the algorithm can be simplified, since the important features do not have to be recognised, determined and extracted. Another advantage is that there is no danger that the most important features, which would contain the most information, can be overlooked with the "feature-free" algorithm development. Ultimately, the essential information is often also in very complex, superimposed or barely comprehensible signal, image or image sequence properties, which makes optimal characteristic value analysis difficult. It is therefore not surprising that the deep learning approach implemented here without characteristic value extraction is superior to the feature extractor-based approaches.

The learning algorithms used are preferably supervised learning algorithms with labelled data sets.

In a further preferred embodiment of the invention, the result with the estimated machining quality is used to regulate the laser machining process. This has the advantage that rejects can be avoided and the quality improvement measures can be carried out more quickly. Material can also be saved. Further details are known to the person skilled in the art. In this context, reference is made to EP3159093B1 of the applicant for further details. If a poor quality is captured or a poor cut is suspected (e.g. high roughness/burr, tear, etc.), machine control signals can be generated automatically. These machine control signals can all be executed automatically on the laser machining system and can, among other things, be designed to carry out the following measures:

clean nozzles and then continue machining, in particular cutting, check nozzles (centring, wear), change nozzles if necessary and then continue machining, correction of cutting parameters, manual correction of cutting parameters, and checking whether the cutting quality improves after the measure, automatic correction of cutting parameters after accessing a trained model.

In a further preferred embodiment of the invention, the first and second signal sequences are each recorded in a synchronised manner, so that a development can be observed over the time of the machining process. Time stamps can preferably be used for training the model in order to be able to provide a local assignment of the signals to the cut contours on the workpiece. However, the time stamps are not explicitly required for access to the trained network, since the deep learning algorithms are based on the fact that the image matrix and the time intervals between the images/photodiode signals are always the same. For quality estimation with the trained network, the synchronicity is particularly important if both streams are to be used at the same time for the estimation. However, it should be noted at this point that a local assignment of the signals to the cut contours is important for training the model, since the labels or features of the cutting quality must be assigned locally to the cutting process. This can be solved using a time stamp.

In a further preferred embodiment of the invention, the method comprises the following steps:

providing captured photodiode signals from at least one photodiode;

accessing the trained neural network and/or a further trained neural network with the captured photodiode signals in order to calculate the result for estimating the machining quality. According to an advantageous embodiment of the invention, the trained machine learning model and the further trained machine learning model can be identical, so that, in addition to the images of the first and second captured signal sequence, the photodiode signals are also calculated in one and the same model.

In a further preferred embodiment of the invention, the captured first and second signal sequence can be an optical signal sequence. The first optical signal sequence differs from the second optical signal sequence in terms of optical recording parameters. For example, the captured first signal sequence can be a sequence of images with illumination and the captured second signal sequence can be a sequence of images without illumination. At least one light source can be used for illumination. The light source can be designed as a light-emitting diode or as a laser, which is used to emit preferably narrow-band illumination light. The light source can be integrated in the machining head or located externally on the machining head.

In a further preferred embodiment of the invention, the captured first signal sequence can be a sequence of images with a first camera setting (e.g. a first aperture setting/depth of focus, image plane, exposure time) and the captured second signal sequence can be a sequence of images with a second camera setting (e.g. second aperture setting/depth of field, image plane, exposure time). A better quality estimate can be achieved using the DNN from the different data sets/images. The term "camera setting" also includes parameters and/or structural features that are arranged outside the camera, but have a technical effect on the images captured by the camera and should therefore be included here as a camera-related setting, such as the arrangement of a variable aperture outside the camera (i.e. outside the sensor chip and lens).

The achievement of the object has been described above using the method. Features, advantages or alternative embodiments mentioned in this way should also be transferred to the other claimed objects and vice versa. In other words, the claims in question (which are directed, for example, to a computing unit or to a computer program product) can also be further developed with the features described and/or claimed in connection with the method. The corresponding functional features of the method (e.g. capturing) are thereby formed by corresponding modules (e.g. data interfaces for capturing/reading), in particular by hardware modules or microprocessor modules, of the system or of the product, and vice versa.

In a further aspect, the invention relates to a computing unit for process monitoring of a laser machining process of a laser machining tool for estimating a machining quality, having:

a data interface to at least one sensor which, during the machining process, is intended to capture a first signal sequence with a first feature and to capture a second signal sequence with a second feature, in each case from the machining zone;

a processing interface to a memory (which can be designed internally and/or externally to the computing unit) in which at least one (trained) neural network is stored, which is accessed with at least the captured first and second signal sequence in order to calculate a result for estimating the machining quality (e.g. a classification result).

The memory with the machine learning model (also referred to as "model" for short), in particular with the DNN, is preferably integrated into the computing unit. This has the advantage that the operator of the laser machining system can carry out the quality improvement measures on site and immediately after commissioning. It is pointed out here that the training of the model is carried out on an external computing unit in a training phase that precedes the operating phase. In this way, the training and test phase of the model is calculated and executed on an external and different computing unit than the application phase of the model is calculated and executed (preferably locally on the laser machining system). In a preferred embodiment of the invention, the computing unit is formed on the laser machining system.

In a preferred embodiment of the laser machining system, the at least one sensor can be an optical sensor. The sensor can in particular comprise a camera or be designed as such. The sensor can optionally comprise at least one photodiode.

An axis of the at least one optical sensor can preferably be arranged coaxially to a machining axis of a laser machining head. The axis of the sensor can run parallel or at an angle to the machining axis of the laser machining head, at least between the cutting nozzle and the workpiece. In particular, the axis of the sensor can deviate from the laser machining axis in an angular range between 5° and 20°. This has the advantage that other image features can be captured by the laser cut. In particular, this brings a considerable advantage when observing the cutting process of steel with oxygen (laser flame cutting), as can be seen from WO2016181359 A1 by the applicant. Because the cutting front runs flat here, the lower part of the cutting front is covered by the edge of the cutting nozzle, and any remaining slag residue cannot be directly captured in a coaxial signal sequence.

In order to capture the different signal sequences, the laser machining system is preferably designed with at least one light source which is used to illuminate the process zone when the first signal sequence is captured. The light source is preferably formed coaxially to the machining axis of the laser machining head (like the sensor). However, in an alternative embodiment of the invention, it is also possible not to arrange the light source coaxially, for example inside or outside the laser head. It can also be preferred to arrange the at least one light source and the at least one sensor outside the machining head of the laser machining system, in particular in spatial proximity to the network interfaces of the optical sensor and/or to supply interfaces. The optical sensor can be designed as a CCD or CMOS camera or CCD or CMOS chip, for example with an image depth of at least 8 bits and ideally a frame rate that exceeds 100 Hz. In a further modification, the pilot laser, that is built into the machining laser, of the laser machining system can be used to generate the illumination. In this embodiment, the illumination power of the pilot laser, which typically has a power of a few mW (generally less than 2 mW), must also be increased to a few 100 to a few 1000 mW.

Furthermore, a dichroic mirror or another filter element can also be formed, which is arranged in the beam path of the laser light in front of a workpiece and is approximately 50% transmissive and approximately 50% reflective for the illumination light.

In a further aspect, the invention relates to a computer program product with computer program code for performing all method steps of the method described above when the computer program is executed on a computer. Another solution to the problem provides a computer program, with computer program code for performing all the method steps of the method described in more detail above when the computer program is executed on a computer. It is also possible that the computer program is stored on a computer-readable medium.

BRIEF OVERVIEW OF THE FIGURES

In the following detailed description of the figures, non-limiting exemplary embodiments with the features and further advantages thereof will be discussed with reference to the drawings. In the figures:

FIG. 1 shows an exemplary view of a cutting edge with a sudden change in the cutting quality;

FIGS. 2a, b show an exemplary representation of a process observation with illumination;

FIGS. 3a, b show a further, exemplary representation of process observation without illumination;

Figure 9B:
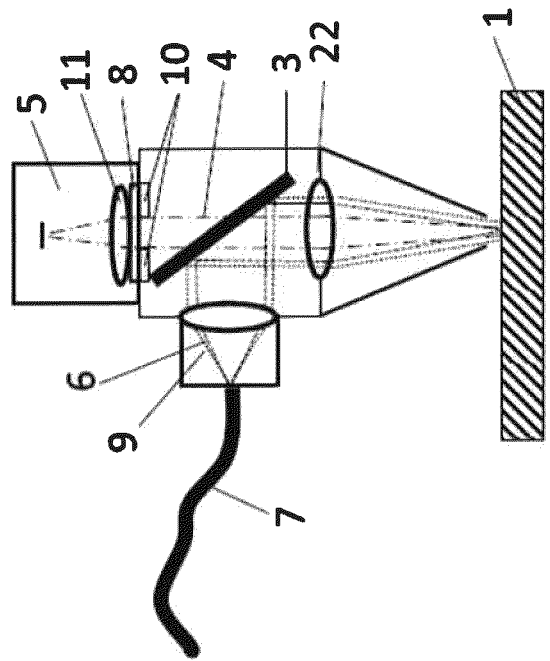
Figure 9A:
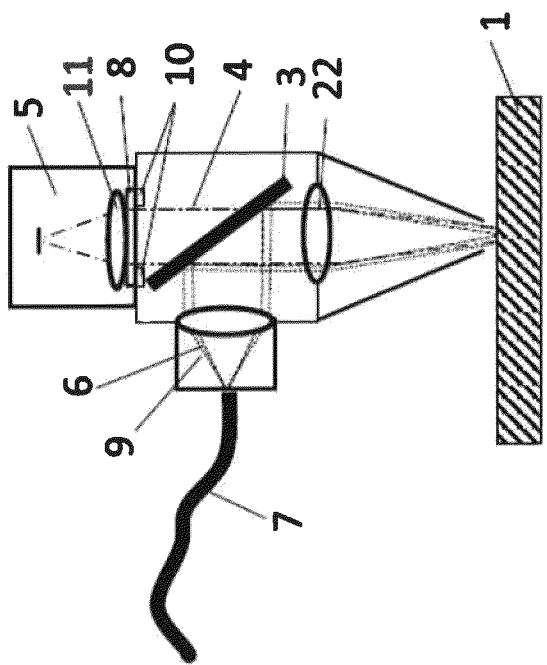
Figure 10:
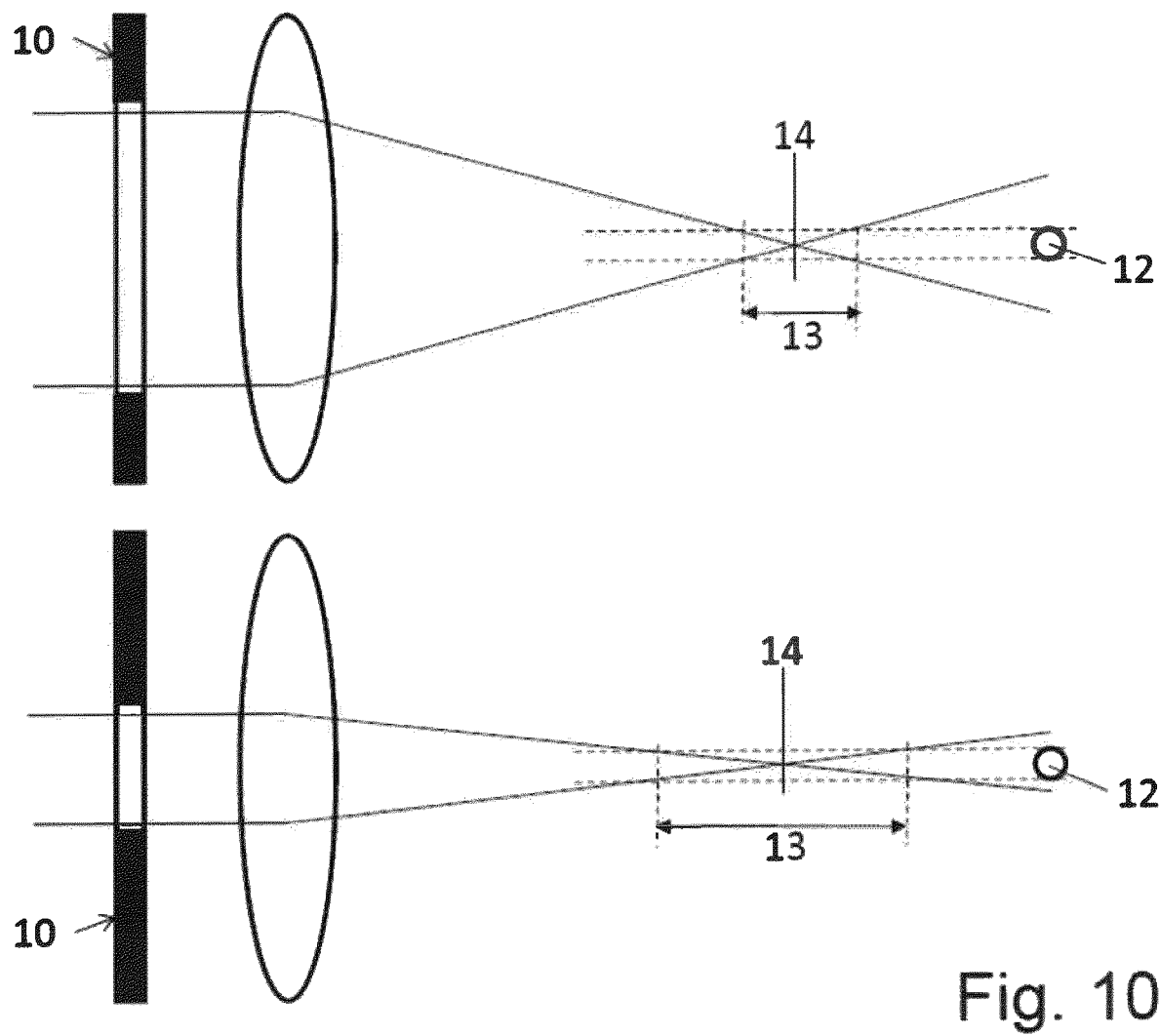
Figures 11A, 11B:
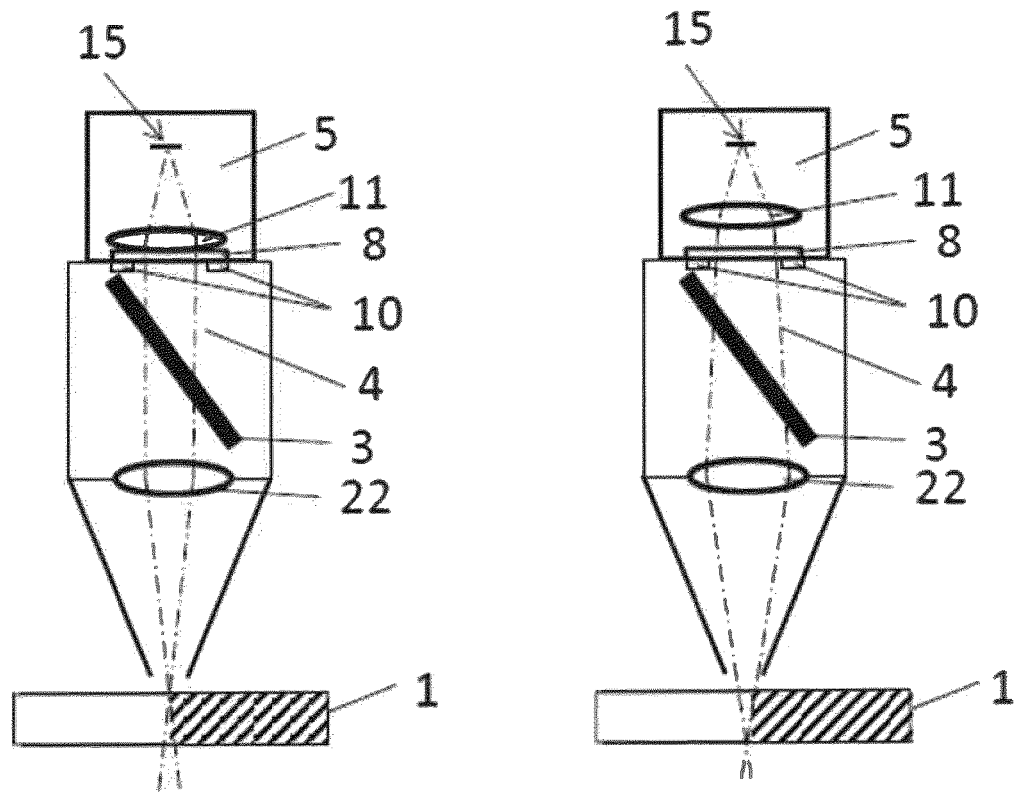
Figure 12:
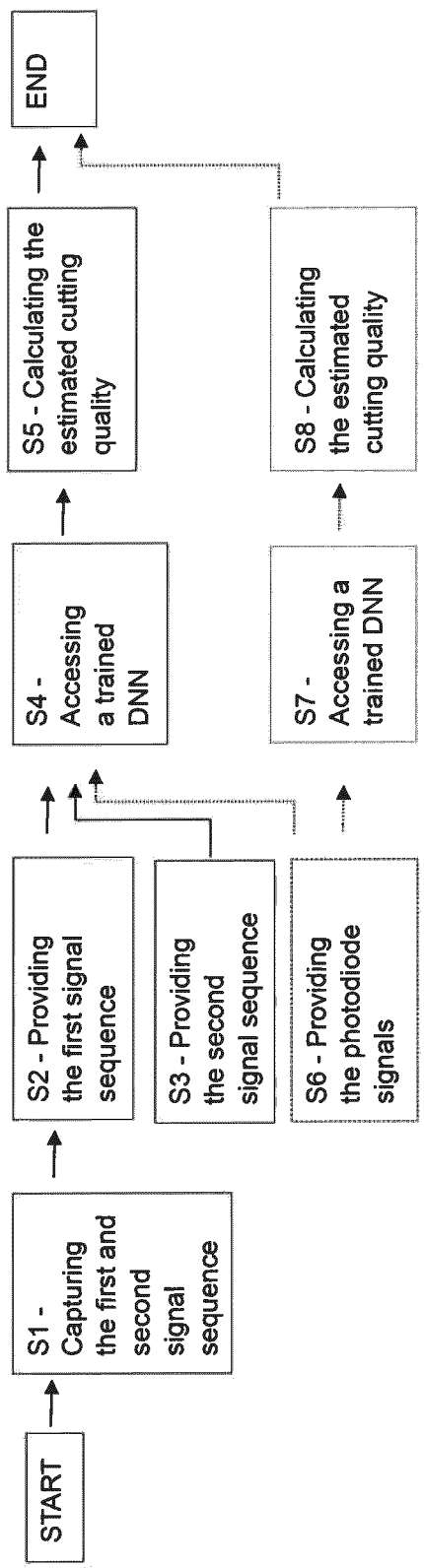
Figure 13:
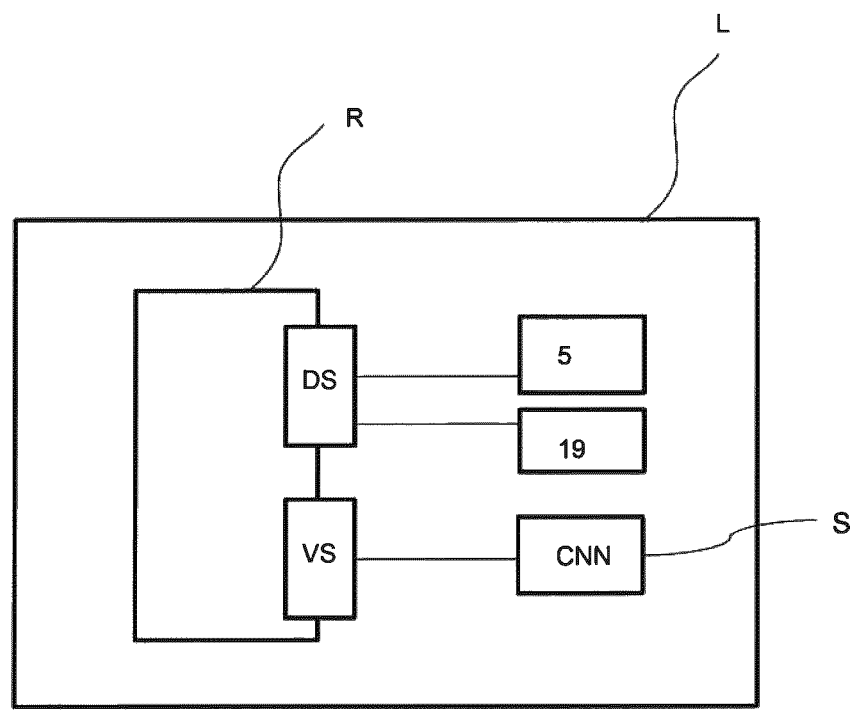

FIGS. 9a, b show a further schematic lateral representation of the machining head with a variable aperture and camera focusing lens;

FIG. 10 show a schematic representation to explain the physical functioning of a variable depth of field;

FIGS. 11a, b show a further schematic lateral representation of the machining head with a variable observation plane;

FIG. 12 shows a flow diagram of a method for quality estimation according to a preferred embodiment (solid lines) and according to a further preferred embodiment of the invention (dashed lines);

FIG. 13 shows a block diagram representation of components of a system according to a preferred embodiment of the invention.

DETAILED DESCRIPTION OF THE FIGURES

The invention is used to estimate the quality of a laser machining process, such as a cutting process. Important quality features are basically burrs (also called barbs), roughness, rounding, groove inclination, welding, slag, etc. "Non-cutting through" or so-called tearing is also a cutting quality classification, which means the worst quality.

The invention makes it possible to infer the cutting quality from observable measurement signals. The choice of suitable sensors for observation and the choice of suitable neural networks and the appropriate algorithms are central to optimal cutting quality estimation. The following shows that suitable sensors, in addition to the usual photodiodes, primarily contain camera recordings with and without illumination. Furthermore, it is noted that the machine learning model, which is based on an end-to-end approach, in particular on the deep learning approach, shows the best correlations between the measurable sensor signals mentioned and the cutting quality of interest.

The laser cutting head was equipped with a video camera to measure the signal sequences. It is preferably aligned coaxially to the laser beam and is located behind the dichroic deflecting mirror which is transparent for illumination and observation and which directs the machining laser onto the workpiece. Such a component, which is transmissive or reflective depending on the wavelength, is referred to as dichroic. In certain arrangements, the deflecting mirror can be semitransparent for the illumination wavelength. In other arrangements, it can/should be completely transparent to the illumination. In contrast, the deflection mirror for the machining laser is always almost 100% (>99%) reflective. In most of the experiments, a camera frame rate of 300 Hz was used, wherein the video was divided into an illuminated and a non-illuminated stream. The frame rate per stream is then still 150 Hz. With an exemplary nominal feed rate of 1800 mm/min (or 30 mm/s), one frame is recorded every 0.2 mm per stream. The signal sequence of frames can be reduced in preprocessing, e.g. so that the images are still 170×170 pixels in size. With the resolution of 100 px/mm in the present example, an image shows an observation area of 1.7 mm×1.7 mm. Obviously, the images in each stream usually overlap significantly.

In addition to the many advantages of a coaxial camera arrangement (such as a simple implementation that is independent of the cutting direction, etc.), there are also disadvantages of coaxial process monitoring. Since the nozzle opening is looked through, the observation is typically limited to the nozzle diameter and the angular spectrum of the captured radiation is usually <5°. A steep cutting front, as can occur in fusion cutting, can only be observed for a very short time, which means that information on the cutting front may be lost. Furthermore, the observation of the formation of grooves on the side walls can also be restricted by the coaxial imaging. The observation of a flat cutting front, as it may occur in flame cutting, can also be restricted by the coaxial observation. A flat cutting front may hardly be completely visible through the nozzle. The rearmost/lowest part remains invisible, although slag residue can arise there if the process status is poor.

The formation of slag, in particular during flame cutting, can therefore be seen a little better with an oblique viewing angle. This oblique view is also referred to as eccentric or off-axis.

In order to eliminate the stated disadvantages of coaxial process monitoring, the coaxial sensor system is therefore often supplemented with off-axis sensors.

Figure 1:
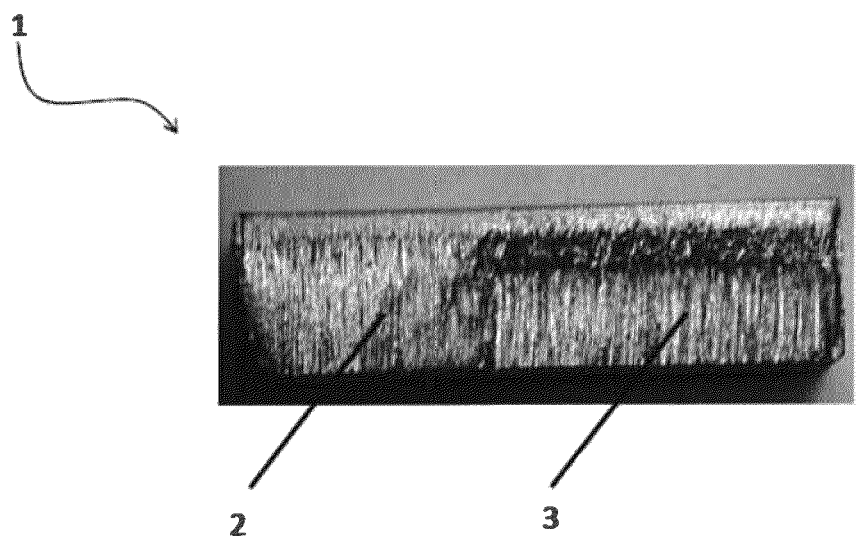

FIG. 1 shows a cutting edge, which is identified by the reference number 1, of a cut workpiece with two exemplary cutting qualities. At position 2, the cut was finer than at position 3. At position 3, a plasma cut even occurred.

As the example from FIG. 1 shows, a cutting process can change from good to sufficient or bad. There are many reasons for this. The machine can wear out or become dirty, or the quality of the workpiece may vary.

Real-time monitoring of the cutting quality is all the more useful, since it enables a reaction to be made if this is recognised or classified as inadequate with the method for process monitoring described here.

Figure 2A:
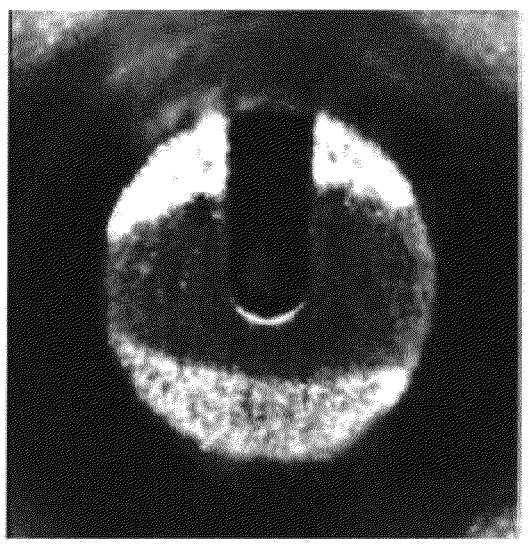

FIGS. 2a and b show example images (video frames) that were captured with a coaxially arranged camera and with illumination, here in a fusion cutting process. In the representation in FIG. 2b, the cutting front is drawn in, i.e. running downwards here. Illuminated recordings are made in such a way that (narrow-band) process illumination illuminates the process zone, wherein this is typically brighter in the observed spectral range than the self-illuminating process. As a result, the process environment, in particular the cutting gap geometry, can be made very clearly visible.

Figure 2B:
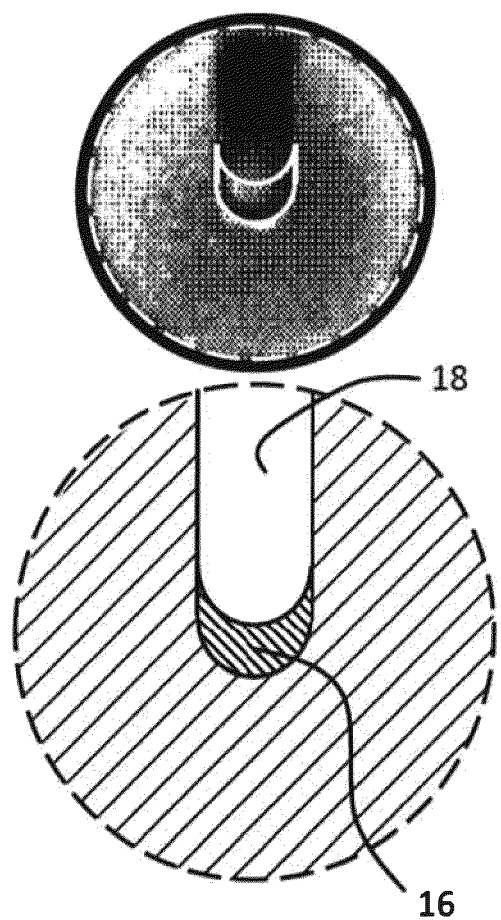

The schematic representation in FIG. 2b shows how the cutting gap 18 can be extracted from the sheet metal surface and from the still faintly visible cutting front 16 by simple image machining, which corresponds to the prior art. According to the present invention, however, the DNN itself learns in the corresponding feature layers or convolutional layers whether and/or how the cutting gap must be extracted in order to support the estimation of the cutting quality.

In particular, in FIG. 2a, the roughness of the cutting edge can be recognised in the upper area. Here, too, the DNN independently learns the spatial features in the image, which correlate with the roughness measured on the test parts.

Figure 3B:
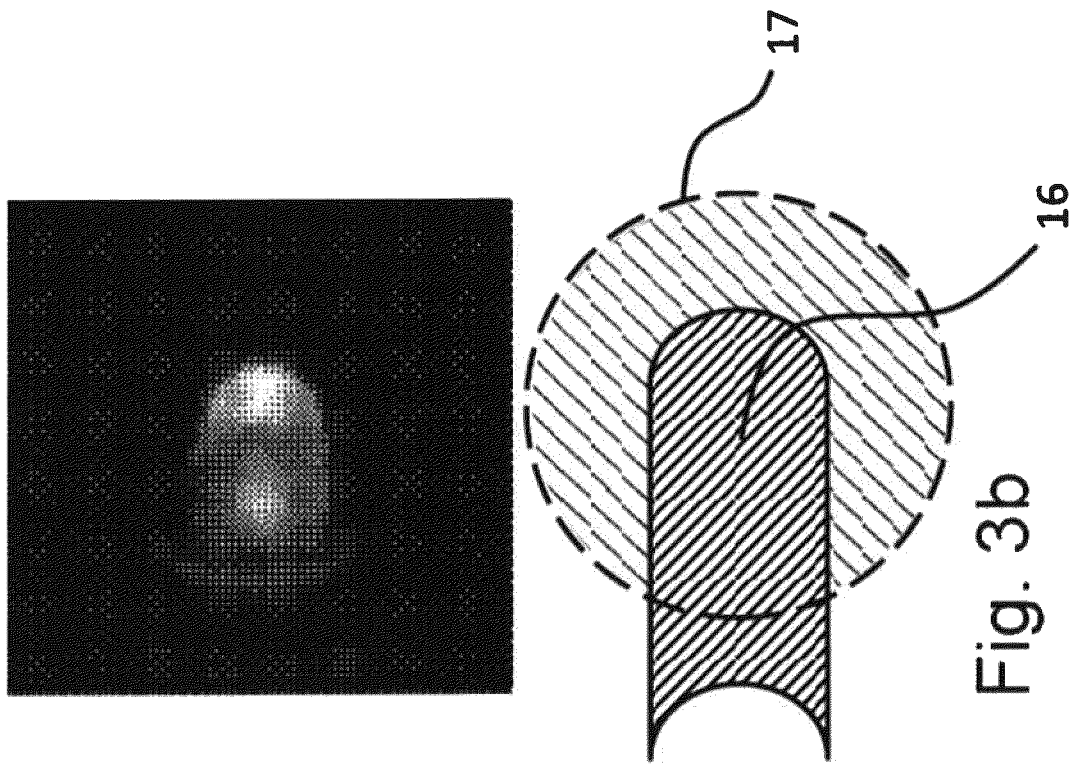
Figure 3A:
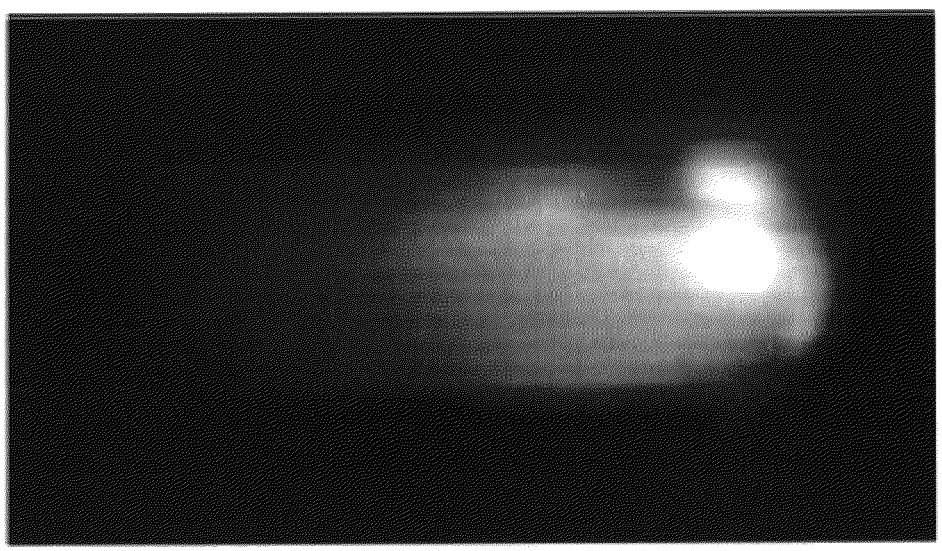

FIGS. 3a and b show further example images that were captured with a coaxially arranged camera without illumination. In the representation in FIG. 3a, fusion cutting is shown. FIG. 3b shows a flame cut, wherein the cutting front is shown again. The non-illuminated camera recording is also valuable, in which there is no illumination of the process zone. Rather, only the self-illuminating process is observed. If the camera gain or exposure is set sensibly, the process illumination can be easily observed despite the built-in narrow band filter. FIG. 3b clearly shows that the melt front 16 runs very flat during flame cutting and its observation can be limited by the nozzle opening 17.

Figure 4:
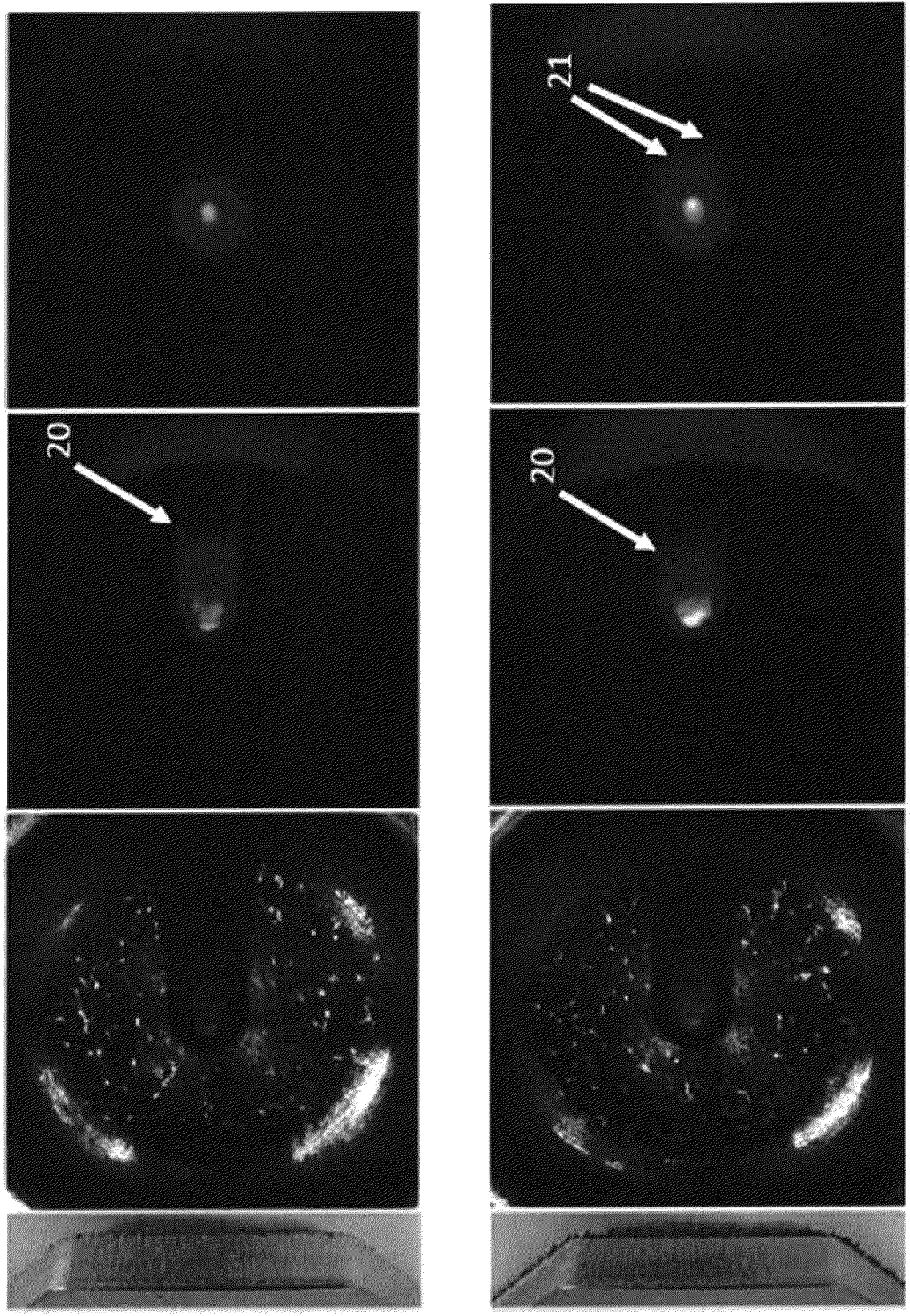
FIG. 4 shows a further, exemplary representation of a process observation with observation illuminated with image plane on the upper edge of the sheet metal, observation non-illuminated on upper edge and observation non-illuminated on the lower edge.

FIG. 4 shows another exemplary example of a fusion cutting process. Two cuts are shown; the top line shows a cut with fewer burrs and the bottom line with lots of burrs. The first column (far left) shows the cut part with visible edges. The second column shows illuminated individual images and columns three and four show non-illuminated images. The individual images in columns 2 and 3 were taken with an initial camera setting so that the upper edge of the sheet metal is shown in focus. Column 4 was made with a second camera setting so that the lower edge of the sheet is shown in focus.

As already mentioned for FIG. 2a, the cutting edge roughness can be recognised from the illuminated image (2nd column). The cutting edge roughness can, however, also be found from non-illuminated images with image sharpness on the upper edge of the sheet (3rd column). Visible process radiation fluctuations 20 due to the formation of grooves in the area of the upper edge can be recognised. Here, too, the DNN independently learns the spatial features in the image, which correlate with the roughness measured on the test parts.

Any burrs are particularly visible in non-illuminated images with image sharpness on the lower edge of the sheet metal (4th column). In this observation configuration, fluctuations 21 in the process radiation come from the lower edge of the sheet metal and show the melt expulsion. This is a hydrodynamic, turbulent process, which is to be understood as a stochastic process. The image sequences therefore show a stochastic, i.e. fluctuating, occurrence of longitudinally drawn cooling zones that indicate the formation of burrs. Here, too, the DNN independently learns the spatial features in the images and, in particular in the case of burrs, also learns temporal features in the image sequences which correlate with the burr height measured on the test parts.

In general, it can be seen that the two camera recordings, with and without illumination, contain different, but equally valuable information for the quality assessment.

Recordings with illumination (FIG. 2) seem primarily to contain information such as cutting gap width, cutting gap symmetry, cutting front angle, groove structure, cutting edge roughness, workpiece structure surrounding the process, etc. Recordings without illumination (FIG. 3), on the other hand, seem to primarily contain information such as the radiation focus, radiation area (with circumference, circularity, symmetry), radiation intensity distribution, radiation contrast, melt film waves, melt expulsion zones, process radiation fluctuations, etc.

Both recordings are used synchronously in order to obtain maximum information. Since, for the purpose of cost and weight optimisation, there is only one camera coaxially available for process observation, one frame is always alternately illuminated during observation and the next one is recorded without being illuminated. The illumination must also be synchronised with the camera recording (including camera gain and camera exposure time). This makes it possible to use one camera to generate two different video streams (one illuminated and one non-illuminated), which synchronously monitor the cutting process in real time.

Figure 5:
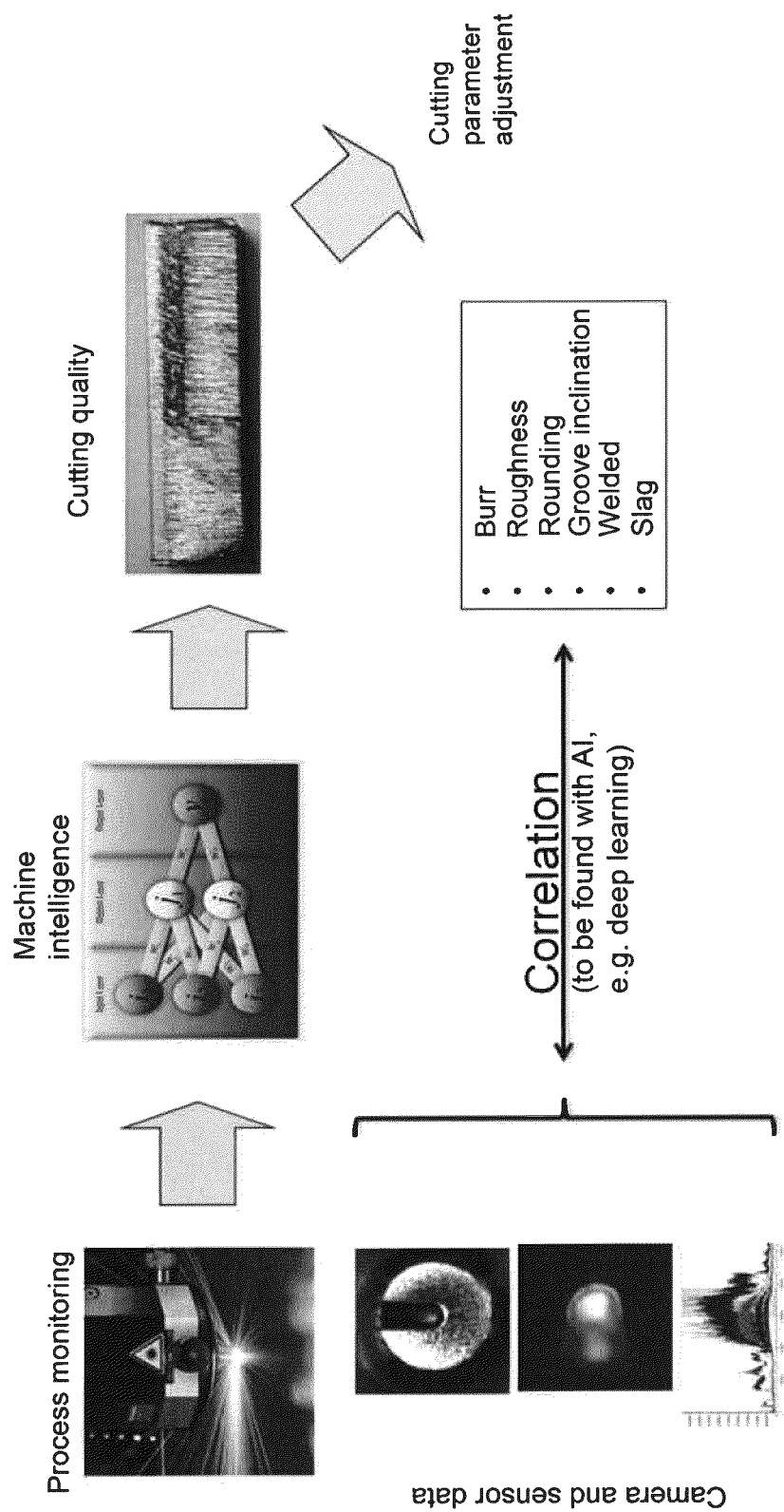
FIG. 5 shows a schematic overview representation of the method for process monitoring using a deep neural network (DNN)

FIG. 5 shows the system for process monitoring and quality calculation. During the machining process, signal sequences are captured by means of suitable sensors (in particular cameras and/or photodiodes). The signal sequences can vary in their capture characteristics (for example, they can be recorded with or without illumination). These signal sequences, also referred to as raw data, are fed to a trained model, in particular a DNN, which is designed to estimate the quality on the basis of the signal sequences on a multifactorial basis. "Multifactorial" means here that the quality calculation includes several factors, as mentioned above, e.g. burrs, slag formation, groove inclination, etc. The result with the quality estimation is almost in real time (with a delay which is due to the calculation time and is no more than a few seconds) and made available during laser machining. The result can be used to initiate measures such as stopping and restarting the cutting process, checking, e.g., the cutting nozzle, etc. The result can also be used to adapt the cutting parameters (automatic cutting process optimisation). In an advantageous development of the invention, the result of the cutting quality estimation can also be implemented in a cutting process control.

FIG. 5 shows the general concept of the invention to the effect that, with selected sensor data (at least two signal sequences or camera streams as well as optional photodiode data), the cutting quality can be inferred by means of an end-to-end architecture of a machine learning system. The machine learning agent (learning robot) with the learning model is trained with training data and an optimisation algorithm and can be operated or used for and/or on the laser machining tool after the training and testing. An important advantage of deep learning, in particular of an end-to-end learning architecture compared to traditional machine learning methods, is that no feature analyses or characteristic values have to be extracted and the learning agent or the neural network itself recognises what to watch out for during training in order to find maximum correlation. This means that the computer-based deep learning system can itself recognise from the images and videos which image and/or video features are relevant for cutting quality capture. If enough data is available for training, which is the case here, deep learning approaches are superior to traditional machine learning approaches (with feature extraction).

After completion of the learning and testing and, if necessary, a validation phase, the DNN can be used to provide a classification result for a first and second captured signal or image sequence. The classification result (also referred to as a result) includes the above-mentioned quality classes, in particular "existing/non-existing burr/slag formation/groove inclination, etc.".

After the training phase, the machine learning model can estimate the cutting quality in real time from the observable signal sequences or sensor data.

Furthermore, process control is made possible, with cutting parameters being automatically adjusted in order to optimise the cutting quality if it has been classified as unsatisfactory. If it is determined that the cutting quality deviates or drifts from the desired target value, the various cutting parameters can be adapted in a typically defined sequence in order to return to the desired cutting quality. The essential cutting parameters are nozzle properties such as centring and wear, focus position of the working beam, gas pressure, power of the working beam and the machining feed rate. These parameters can all be adapted automatically on the laser machining system. The following steps to control the cutting quality can be carried out automatically:

check nozzle properties and then continue cutting, which can include the following steps
clean nozzle,
check the centring of the nozzle opening to the working laser and correct if necessary
check nozzle type and correct if necessary, i.e. replace nozzle
check the nozzle for wear and replace with a new nozzle if necessary
then continue machining, in particular cutting, correction of the focus position during cutting. If the above measures have not yet led to an improvement in quality, the focus position can be corrected. Experience has shown that thermal heating of the cutting head optics pulls the focus position upwards (with transmissive elements), which is why the focus position should be corrected/regulated downwards. However, if the cutting quality then deteriorates, it should be corrected immediately in the opposite direction. It is corrected until the cutting quality corresponds to the desired target value again.

correction of the gas pressure during cutting. If the above measures have not yet led to any quality improvement, the gas pressure can be corrected. In particular, increasing the gas pressure can minimise burr formation. However, should the cutting quality deteriorate, it should be corrected immediately in the opposite direction. It is corrected until the cutting quality corresponds to the desired target value again.

correction of power during cutting. If the above measures have not yet led to any quality improvement, the power can be corrected. If there is too little power, for example due to degeneration of the laser, the power can be increased. However, should the cutting quality deteriorate, it should be corrected immediately in the opposite direction. It is corrected until the cutting quality corresponds to the desired target value again.

correction of the feed rate. If the above measures have not yet led to any quality improvement, the feed rate can be adapted. This may be necessary if, for example, the material quality has been adversely affected, due to rust, dirt, oil, etc. on the material surface. Furthermore, it is also possible that the system properties of the machine deteriorate, e.g. due to soiling of the cutting head optics, which is why reducing the feed rate in order to increase the cutting quality may help. However, should the cutting quality deteriorate, it should be corrected immediately in the opposite direction. It is corrected until the cutting quality corresponds to the desired target value again.

if even correcting the feed rate does not help to improve the cutting quality, the machining system may be so badly degraded, for example due to heavily soiled or damaged optics, that optimising the cutting parameters cannot improve the cutting quality. In this case, the machine can be stopped and the operator notified.

The control strategies explained above are exemplary and not the only possible strategies. It is also conceivable that the neural network, in addition to determining a deviating quality, also recognises which specific cutting parameters may be the main reason for this. Depending on the misalignment of a specific cutting parameter, the quality error pattern may look different. Correspondingly, the suspected faulty cutting parameter is primarily corrected.

In a further alternative control strategy, a theoretical physical cutting model is also used, which can support the correction of the cutting parameters by making it possible to record various variables such as cutting gap width, melt film thickness, etc., which are contained in the theoretical model, through process observation. The current state of the cutting process is therefore known to the physical model, which means that it can be concluded that a cutting parameter is incorrect. Correspondingly, the suspected faulty cutting parameter is primarily corrected. All of the control strategies explained above are exemplary and not conclusive.

In a preferred embodiment of the invention, a deep neural network DNN and preferably a convolutional neural network CNN can be used as the neural network, which transmits an image of the signal sequence and/or a photodiode signal of the signal sequence and/or further signals as input to the input layer. According to an advantageous architecture of the CNN, the network can consist of a cascading of different layers, in particular a convolutional layer (CONN), followed by an activation layer (ACT), followed by a pooling layer (POOL). This sequence (CONN, ACT, POOL) can be cascaded several times before one or more fully connected layer(s) and an output layer are interconnected. The output layer is intended to output a classification result in the form of estimated quality classes for the respective input. The convolutional layer can be designed as a linear filter which calculates a filtered image (feature map) so that the weights only have to be calculated for the filter and not for each pixel. The pooling layer (maxpooling or averagepooling) is used to reduce dimensions, which can be achieved by subsampling. As described above, the automatically calculated features can thus be provided at the output of the CNN. These features can be classified to the target classes with the fully connected layer or a plurality of fully connected layers connected in sequence. The output layer can be designed as an activation layer with a Softmax activation function.

The deep learning algorithms are data-intensive and computationally-intensive and are therefore preferably calculated on a graphics card (graphics processing unit/GPU) or a tensor processing unit (TPU) or networks of processors. Each layer of the neural network can be calculated on powerful, massively parallelisable processors, in particular multi-core or many-core processors. The computing unit is preferably designed as a graphics card or the other hardware modules mentioned above or comprises such a card.

The computing unit can preferably comprise a user interface (e.g. GUI) which is intended to display the result of the process monitoring during the machining process.

The deep learning algorithms can be implemented in Python or another high-level language such as C++ or CUDA. Simple CNN, residual nets or wide residual nets, for example, can sometimes be used as DNN architectures.

In order to counteract so-called overfitting, an early stopping method can preferably be used during training, in which the training is stopped as soon as the error in the validation set increases again.

Tests have shown that it is particularly advantageous for a quality classification if the recorded signal sequences actually represent a development over time and thus time-dependent features.

In order to map the signal sequence in the DNN in this case and thus to be able to learn time-dependent features, so-called gated recurrent units (GRU) or long short-term memory networks (LSTM) can be used in combination with the CNN.

Figure 7:
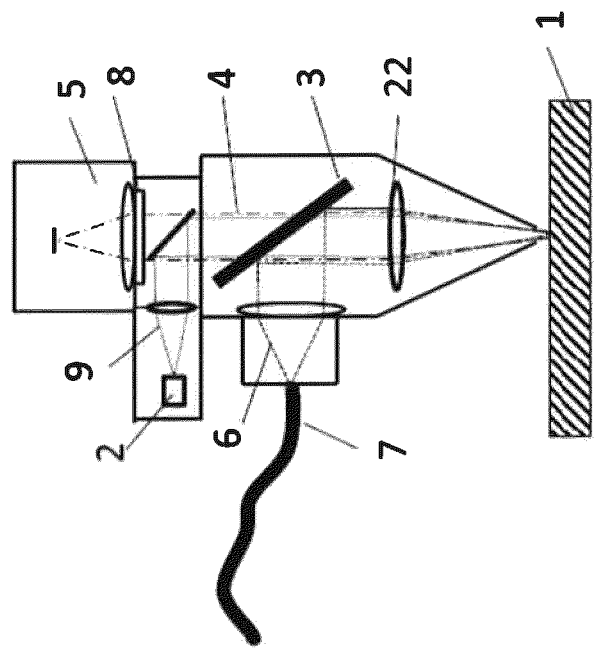
FIG. 7 shows a further schematic lateral representation of the machining head with coaxial process illumination and a coaxial camera arrangement.
Figure 6:
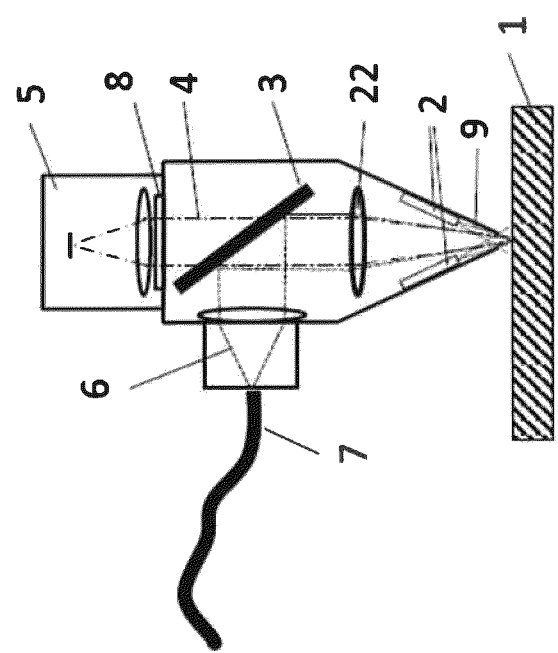
FIG. 6 shows a schematic lateral representation of the machining head with OFF-axis process illumination and a coaxial camera position.
Figure 8:
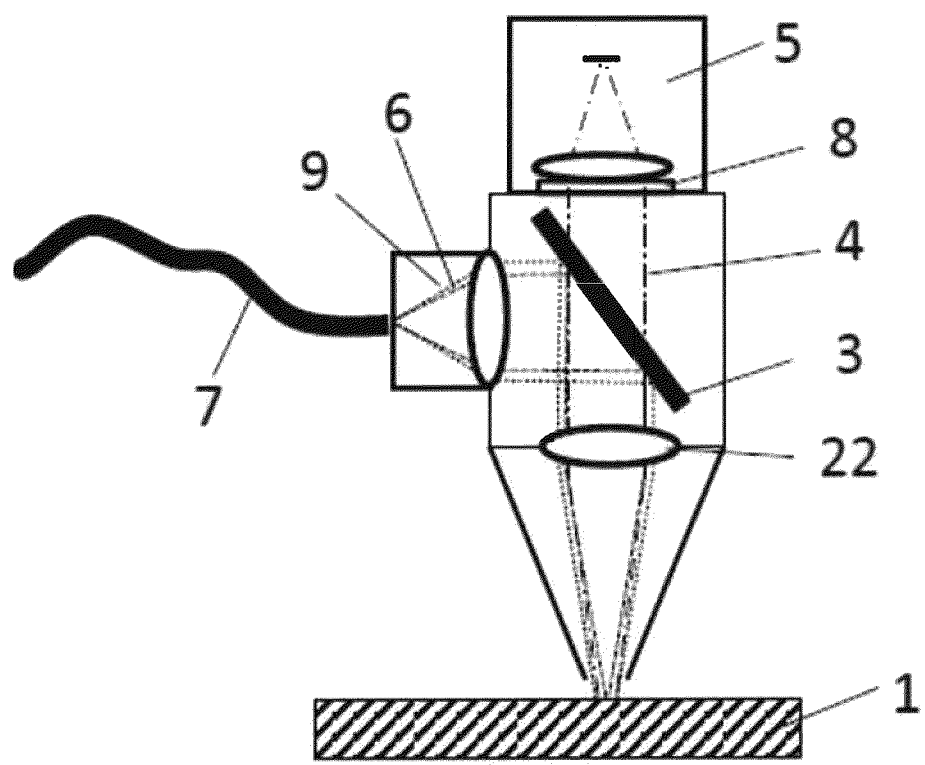
FIG. 8 shows a further schematic lateral representation of the machining head with coaxial process illumination and a coaxial camera arrangement.

FIGS. 6-8 outline how a cutting head can be constructed with the required sensors. The preferred variant corresponds to FIG. 7.

FIG. 6 shows a first possible variant. The machining beam 6 comes from the laser via transport fibre 7 into the machining head, where the laser beam is directed from a dichroic mirror 3 onto the workpiece 1 in order to process the workpiece there. Light sources 2, which illuminate the process zone with narrow-band illumination light 9, are attached to the machining head. For example, light emitting diodes (LEDs) or lasers are used.

The camera 5 observes the process zone, wherein a narrow-band filter 8 is attached in front of the camera, which only allows the light spectrum of the illumination to pass through and suppresses all other wavelengths. As a result, the capture of the self-luminosity of the process and of the machining laser beam is strongly suppressed and enables improved observation of the illumination laser reflections on the workpiece. This is of particular interest in the vicinity of the cutting gap and is typically clearly visible. The dichroic mirror 3 is designed in such a way that it is permeable to the observed light 4. The light sources can be attached within the cutting head, as shown in FIG. 6.

A further conceivable embodiment can be seen from the one in FIG. 7. Here the illumination 2 is coupled coaxially into the observation beam path in the vicinity of the camera block 5.

Another possible embodiment is shown in FIG. 8. Here, the illumination light 9 is generated in the working laser and is transported to the cutting head via the transport fibre. This embodiment requires the dichroic mirror 3 to be designed ideally to be 50% transmissive and 50% reflective for the illumination light. This embodiment is advantageous in that the illumination is generated remotely from the head and leaves the head simply.

The approach of taking several different recordings with a coaxial camera and capturing them in different signal sequences (streams) can be taken further. In addition to (alternating) recordings with and without illumination, other adjustable settings can be imagined and implemented, which can increase the information content of the process observation.

The observation depth, i.e. the depth of field of the process observation, can also be varied. The depth of field (often synonymous with depth of focus) is a measure of the extent of the sharp area in the observed object space. In an imaging optical system, the variable depth of focus can be achieved by introducing a variable aperture. FIG. 9 shows an example of the cutting head from FIG. 8 with a variable aperture 10. In FIGS. 9a and b, the aperture is adjusted to be large or small. Likewise, an aperture can also be installed in other cutting FIG. 10 explains the effect of an aperture 10 with a variable light passage opening for the purpose of changing the depth of focus 13. In geometrical optics, only pixels on exactly the image plane 14 are shown in focus. With increasing distance from the image plane, each focussed pixel becomes an ever larger, unfocussed slice. This slice is referred to as the blur circle 12. The transition from point to slice is fluid, and somewhere in between there is the boundary between what is still perceived as focussed and what is already perceived as blurred. How large this area (i.e. the depth of focus) is depends on the angle of the light cone and thus on the aperture opening. If the aperture opening is large, the result is a small depth of focus and vice versa for a small aperture opening.

Depending on the machining process and the process characteristics of interest, a large or small depth of focus can be advantageous for process monitoring. Examples are attached here by way of example and are not exhaustive. The workpiece edge roughness can thus be determined more precisely at certain heights of the workpiece thickness with a small depth of focus. On the other hand, with a large depth of focus, an averaged roughness over a large workpiece thickness can be determined. For the observation of the melt flow fluctuations of the molten metal, both a small and (e.g. alternating) a large depth of focus can be advantageous.

During process observation, alternating images with different depths of focus can be recorded in order to describe the machining process as comprehensively as possible and to obtain maximum information about it.

Another variable setting in the imaging system is the placement of the observation or image plane 14 along the direction of observation. Depending on the setting of the camera focusing lens 11, see FIG. 11, this image plane is at a different location. FIG. 11 shows that the observation or image plane moves downwards with a shorter distance between the focusing lens 11 (the lens labelled with the reference symbol 11 relates to that of the camera and the reference symbol 22 denotes the focusing lens of the laser) and the camera sensor 15 (camera chip, CMOS or CCD chip). In FIGS. 11*a* and *b*, the distance between the focusing lens 11 and the camera chip 15 is adjusted to be large or small. The different setting causes the image plane, for example, to shift from the upper edge of the workpiece (FIG. 11*a*) to the lower edge of the workpiece (FIG. 11*b*). The shifting of the image plane is particularly interesting when a small depth of field is selected. This is because a plane in the cutting gap, for example the upper or lower edge of the joint, can be specifically observed. It should be noted that, instead of moving the camera lens, the focal length of an optical system can also be changed in some other way. Instead of fixed (e.g. glass) lenses, fluid lenses are increasingly being used. Such fluid lenses can usually change the focal length very quickly (up to several kHz). Some work by applying a voltage to conductive liquids, which change their surface shape with the applied voltage. Others function similarly to the human eye in that a liquid-filled, elastic lens is mechanically deformed to change the focus.

Depending on the machining process and the process characteristics of interest, a different observation plane can be advantageous for process observation. Examples are attached here by way of example and are not exhaustive. An observation plane at the upper edge can be particularly suitable if the melting wave stimulation is to be observed. Grooving on the upper edge can also be observed particularly well in this way. On the other hand, placing the observation plane at the lower edge is advantageous if the formation of burrs or the adherence of smelting and slag is to be observed. It should be mentioned that FIG. 4 shows the different possibilities of observation depending on the selected image plane.

Another variable setting in the imaging system is the exposure time of the camera. The exposure time of a camera can also usually be changed very quickly—comparable to the sampling rate of the camera. The recording of an object with images with different exposure times is interesting because these different images can be offset against one another using a high dynamic range method (HDR method) in order to provide an image with increased contrast.

During process monitoring, alternating images with different exposure times can be recorded, whereby neighbouring images can be offset with an HDR method and the contrast and thus the information content can be increased. Alternatively, the recordings of different exposure times can be fed directly to the deep learning algorithm according to the end-to-end approach. This is necessary in particular when the recording location between the first and second image is significantly spaced apart due to a high feed rate speed of the laser. In this way, the machining process can be described as comprehensively as possible and maximum information about it can be obtained.

The recording of an individual image (first or second signal sequence) can thus be changed in many ways. In particular, the following camera settings can be changed and the signal sequences captured in this way can be fed to the DNN as input:
1) illumination,
2) depth of focus/aperture setting,
3) image plane and/or
4) exposure time.

The first signal sequence can thus be an image sequence with illumination and the second signal sequence can be an image sequence without illumination. The first signal sequence can also be an image sequence with a first aperture setting and the second signal sequence can be an image sequence with a second aperture setting. The first signal sequence can also be an image sequence with a first image plane and the second signal sequence can be an image sequence with a second image plane. The first signal sequence can also be an image sequence with a first exposure time and the second signal sequence can be an image sequence with a second exposure time.

If different video streams are recorded alternately, only one parameter (e.g. the illumination) can be changed in the respective signal sequences (streams) or several parameters together. The following streams could be an interesting combination Stream 1: illuminated images with the image plane on the upper edge of the workpiece Stream 2: non-illuminated images with the image plane on the lower edge of the workpiece Ideally, the individual images from Stream 1 and Stream 2 are recorded alternately and can be viewed as synchronous during further machining.

Other combinations of the above-mentioned variable parameters are also conceivable. It is also conceivable, for example, to record more than 2 different signal sequences/streams. Instead of the two streams noted above, the following streams could also be of interest Stream 1: illuminated images with the image plane on the upper edge of the workpiece Stream 2: non-illuminated images with the image plane on the upper edge of the workpiece Stream 3: non-illuminated images with the image plane on the lower edge of the workpiece Ideally, the individual images from Stream 1, Stream 2 and Stream 3 are recorded in succession and can be viewed as almost synchronous during further machining.

A large number of other examples of possible combinations of settings are conceivable. If it is assumed that the four setting parameters are changed with two settings, then $2^4=16$ different individual images can be generated. How many streams and which combinations of setting parameters are most suitable is open.

As already mentioned above, it is possible that, in addition to the camera observation discussed above, photodiodes can also be used for the purpose of additional process observation. These are mostly traditionally available in cutting systems, easy to control, space-saving to install and inexpensive. They also have the advantage that their sampling rate is significantly higher than that of cameras. This enables them to provide additional information. In particular, coaxially arranged photodiodes and those in the cutting head nozzle area that look at the process at an angle are possible.

If video recordings and optionally photodiode signals are available, conclusions can be drawn about the cutting quality by means of the neural network (in particular DNN, in particular CNN) and related machine learning algorithms. For this purpose, an end-to-end algorithm is preferably used as an algorithm for training a neural network, preferably a deep learning algorithm.

An end-to-end algorithm enables the training of a complex learning system that is represented by a single model that represents the complete target system. As a result, problem-specific knowledge does not have to flow into the model architecture, which enables comprehensive data-driven learning. The prerequisite for this is that sufficient data is available for the training. In addition, the data must be at least partially labelled, i.e. labels must be available for the raw data (supervised learning).

Deep neural networks (DNN), which are trained with at least one deep learning algorithm, are preferably used as models in the end-to-end approach. Deep learning describes a class of optimisation methods of artificial neural networks that have numerous intermediate layers between the input layer and the output layer (deep networks) and thus have an extensive internal structure in order to solve complex tasks. In the extension of the learning algorithms for network structures with very few or no intermediate layers (so-called flat networks, shallow nets), as with the single-layer perceptron, the deep learning methods enable stable learning success even with numerous intermediate layers. The many intermediate layers enable high-dimensional input data to be abstracted step-by-step, which is particularly suitable for images and image sequences without the need to predefine the extraction of characteristic values (image features). There is a multitude of network structures, of which convolutional neural networks (CNN) and residual neural networks (RNN) are preferably used for the task at hand with camera images. For image sequences or temporal signals, temporal relationships or temporal features can be learned. Gated recurrent unit (GRU) and long short-term memory (LSTM) networks are suitable for this. It is advantageous to use a combined network that combines the above network structures in different layers.

So that the cutting quality can be estimated in real time during cutting, the model must initially be trained with a lot of data. To do this, many cutting contours or parts of different cutting quality are produced and all sensor data is saved. Typically, a data set for a material type (e.g. metal alloy) and a sheet thickness comprises at least 50 or significantly more test parts, cut with a wide variety of settings for the cutting parameters (such as laser power, focus position, gas pressure, feed rate) and with various external influencing factors (e.g. material quality, surface quality, material temperature, contamination of laser protection glass). Then the cutting quality features of the cutting contours are determined. The features are preferably measured locally separated over the entire cutting contour with, for example, a surface measuring device. Alternatively, the cutting quality can also be assessed by experts and the data records can be labelled accordingly. Cutting quality criteria have already been mentioned above, primarily these are burr height, slag residue and cutting edge roughness. It is also possible to use the 3D point clouds of the measured cut surfaces for the training instead of the quality features determined.

As described above, deep learning algorithms are preferably used for training (e.g. a stochastic gradient descent algorithm in the simple case) in order to determine the network parameters in the respective layers on the basis of the labelled training data. The task of the respective learning algorithm is to minimise the error between the target output and the calculated output of the model; this represents a statistical optimisation problem. An optimiser is used for this. If the respective error is minimised, the weights are optimal and the network is described as optimally trained. After successful training, the algorithm will automatically recognise the cutting quality according to the trained criteria.

It should be noted that, in addition to the preferred deep learning algorithms, other algorithms can alternatively or additionally also be used, for example polynomial regression models.

An online learning method can be integrated as a further advantageous embodiment of the invention. To this end, the model trained according to the above methods is followed by an algorithm for adaptively setting certain model parameters. This can be implemented, for example, by means of a reinforcement learning algorithm or by means of a sparse coding algorithm (see Blakely, C.: "*Adaptive Real-Time Learning and Prediction, A Sparse Hierarchical Machine Learning Algorithm*", SDS 2019; accessible on the internet at: https://sds2019.ch/_Resources/Persistent/11a5151326-cf4b9fbbc490a1081af9d2d7bc6971/C.%20Blakely%2C% 20signifAiFX%2C%20Adaptive%20Real-Time%20Learning%20and%20Prediction.pdf). As a result, the estimation of the cutting quality can be adjusted in real time during the cutting or intermittently by means of feedback from the machine operator. In this context, reinforcement learning is to be understood as a method of machine learning that tries to maximise a reward through independent actions within a system. It is not necessary for all data to be labelled.

FIG. 12 shows a flow chart of the estimation method. After the start of the method, at least the first and the second signal sequence are recorded in step S1. In step S2, S3, the captured first and second signal sequences are provided. In step S4, the trained neural network model, in particular the DNN, e.g. a CNN, with an optional layer for sensor fusion of the captured first and second signal sequences is accessed, in order to provide the result with an estimate of the machining quality for the measured signal sequences in step S5.

If, in addition to the camera images, other sensor signals, such as photodiode signals for classifying the estimated machining quality, are to be taken into account, a layer of the neural network can be designed for sensor fusion. In this embodiment of the invention, the different input data are calculated in one and the same machine learning model (or deep network).

In an alternative embodiment of the invention, a separate, further neural network can also be provided for implementing a further machine learning model, which is used to classify the photodiode signals and has been specifically trained for this signal variant. Then, as shown in dashed lines in FIG. 12—because it is optional—the signals of the photodiodes can be provided to the input layer of the further trained neural network in step S6, which is then accessed in step S7 for the purpose of classification or to predict the processing result quality in step S8. This implementation has the advantage that the classification result can be reliably made available even if the camera fails.

Different algorithms and processes can be used for sensor fusion. In principle, one network architecture is always combined into an overall network for each signal sequence. Depending on the signal sequence, these can be identical or different network architectures. The fusion can be realised by a simple sensor fusion layer, on the one hand. In this case, everything is trained together. In an alternative advantageous embodiment of the invention, the individual networks are trained separately in order to find the best possible features. The classification layers are then cut off from both networks. The remaining feature extractor layers are then merged and the new classification layer is trained with them.

In this embodiment, a combined neural network is built from several individual networks. The training would thus take place over several steps.

Both variants correspond to end-to-end training. In the last variant, the training takes place in several steps. During this training phase, no specialist knowledge is incorporated, so it is still automatic end-to-end training.

Sensor fusion is generally used for several types of signals, such as diodes and cameras. The type of the respective signals is irrelevant for the sensor fusion. A simple sensor fusion between similar and/or the same signal types can also be carried out, such as a sensor fusion between the captured first and the recorded second signal sequence, e.g. the signal sequences with illuminated and non-illuminated recordings, and this although basically the same sensor type (optical) was used in both signal sequences. Other combinations of signal sequences are also possible.

FIG. 13 shows a schematic representation of modules and units of a system for quality estimation of the laser machining system L. For this purpose, this is designed with a computing unit R or connected to the same via a network interface. The laser machining system L has a camera 5 and a memory S in which at least one trained neural network (DNN, CNN) is stored. The computing unit R can receive the signal sequences captured by the camera 5 and/or optionally by the photodiodes 19 via a data interface DS and use them to access the memory S so that the CNN can calculate the result with an estimate of the machining quality.

It should be noted that, in a preferred embodiment of the invention, the algorithm is further developed so that the machine continues to learn with the implemented method for process monitoring at the customer's premises. As already mentioned above, this can be implemented, for example, with a reinforcement learning method, or with a sparse coding algorithm. Depending on the customer, the cutting quality can be assessed differently. A cutting quality that still seems acceptable to one customer may be judged to be unsatisfactory for another. One advantage of the algorithm described here as a solution is that the sensitivity of the customer is learned and is taken into account individually and system-specifically during process monitoring.

Finally, it should be noted that the description of the invention and the exemplary embodiments are not to be understood as limiting in terms of a particular physical realisation of the invention. All of the features explained and shown in connection with individual embodiments of the invention can be provided in different combinations in the subject matter according to the invention to simultaneously realise the advantageous effects thereof.

The scope of protection of the present invention is given by the claims and is not limited by the features illustrated in the description or shown in the figures.

LIST OF REFERENCE SYMBOLS

1 Workpiece
2 Light source(s), in particular light-emitting diode
3 Dichroic mirror
4 Observed light
5 Camera block
6 Machining beam of the laser
7 Transport fibre
8 Filter
9 Illumination light
10 Aperture
11 Focusing lens of the camera
12 Blur circle
13 Depth of focus
14 Image plane
15 Camera sensor
16 Cutting front
17 Nozzle opening
18 Cutting kerf
19 Photodiode(s)
20 Process lights, upper
21 Process lights, lower
22 Focusing lens of the laser of the laser machining tool
S1 Capturing the first and second signal sequence, in particular alternating capturing
S2 Providing the captured first signal sequence
S3 Providing the captured second signal sequence
S4 Accessing a trained machine learning model, in particular a CNN
S5 Calculating the result with the estimated machining quality
S6 Providing photodiode signal sequences
S7 Accessing a trained machine learning model
S8 Calculating the result
R Computing unit
L Laser system
S Memory for storing the trained model
DS Data interface
VS Processing interface

The invention claimed is:

1. A method for process monitoring of a laser machining process for estimating a machining quality, wherein steps of the method are carried out in real time during the laser machining process, the method comprising:
    providing a captured first signal sequence with a first feature from a machining zone;
    providing a captured second signal sequence with a second feature from the machining zone;
    accessing a trained neural network with at least the captured first signal sequence and the captured second signal sequence in order to calculate a result for estimating the machining quality,
    wherein the captured first signal sequence and the captured second signal sequence are each an optical signal sequence, and are captured with a same optical sensor in alternating form, and
    wherein the captured first signal sequence is a first sequence of images with illumination,
    wherein at least one light source is used for the illumination, and
    wherein the captured second signal sequence is a second sequence of images without the illumination.

2. The method according to claim 1, wherein a deep neural network (DNN) is used as the neural network and, during the training of the deep neural network (DNN), features of the captured firsts signal sequence and features of the captures second signal sequence, including those spatial or temporal properties that are relevant for estimating the machining quality and are to be taken into account for calculating the result, are defined.

3. The method according to claim 1, wherein the result with the estimated machining quality is used to regulate the laser machining process.

4. The method according to claim 1, wherein the capturing the captured first signal sequence and the captured second signal sequence is in each case synchronised, so that a development over a time of the machining process can be observed, wherein time stamps are used for training the trained neural network in order to be able to provide a localised allocation of signals to cut contours on a workpiece.

5. The method according to claim 1, wherein the method further comprises:
    providing captured photodiode signals from a quantity of photodiodes;
    accessing the trained neural network and/or a further trained machine learning model with the captured photodiode signals in order to calculate the result for estimating the machining quality.

6. The method according to claim 1, wherein the captured first signal sequence includes the first sequence of images with a first camera setting and wherein the captured second signal sequence includes the second sequence of images with a second camera setting.

7. A laser machining system with a computing unit for process monitoring of a laser machining process of a laser machining tool for estimating a machining quality, the laser machining system comprising:
- a data interface to at least one sensor which, during the machining process, is configured to capture a first signal sequence with a first feature from a machining zone and configured to capture a second signal sequence with a second feature from the machining zone;
- a processing interface to a memory in which at least one trained neural network (DNN) is stored, wherein the trained neural network is accessed with the first signal sequence and the second signal sequence in order to calculate a result for estimating the machining quality,
- wherein the first signal sequence and the second signal sequence are each an optical signal sequence, and are captured with a same optical sensor in alternating form, and
- wherein the first signal sequence is a first sequence of images with illumination, wherein at least one light source is used for the illumination and
- wherein the second signal sequence is a second sequence of images without the illumination.

8. The laser machining system according to claim 7, wherein the memory is integrated in the computing unit.

9. The laser machining system according to claim 7, wherein the at least one sensor is an optical sensor and comprises a camera and at least one photodiode.

10. The laser machining system according to claim 7, wherein an axis of the at least one sensor is arranged coaxially and/or obliquely, in an angular range between 5° and 20° relative to a machining axis of a laser machining head.

11. The laser machining system according to claim 7, wherein a quantity of light sources are arranged which are used to illuminate the machining zone when capturing the first signal sequence, wherein the at least one sensor includes an optical sensor.

12. The laser machining system according to claim 11, wherein the quantity of light sources and the optical sensor are arranged coaxially to a machining axis of a laser.

13. The laser machining system according to claim wherein the quantity of light sources and the optical sensor are arranged outside a machining head of the laser machining system and in close proximity to network interfaces of the optical sensor.

14. The laser machining system according to claim 7, wherein a laser of the laser machining system is used to generate the illumination, wherein a dichroic mirror or a filter element is arranged in a beam path of laser light of the laser in front of a workpiece and is approximately 50% transmissive and approximately 50% reflective for the laser light.

15. A non-transitory computer readable medium comprising computer program code for performing the steps of the method according to claim 1 when the computer program code is executed on a computing unit.

* * * * *